Feb. 24, 1942.  P. WHITCOMB  2,274,175
ELECTRIC HOIST
Filed Sept. 6, 1938  3 Sheets-Sheet 1
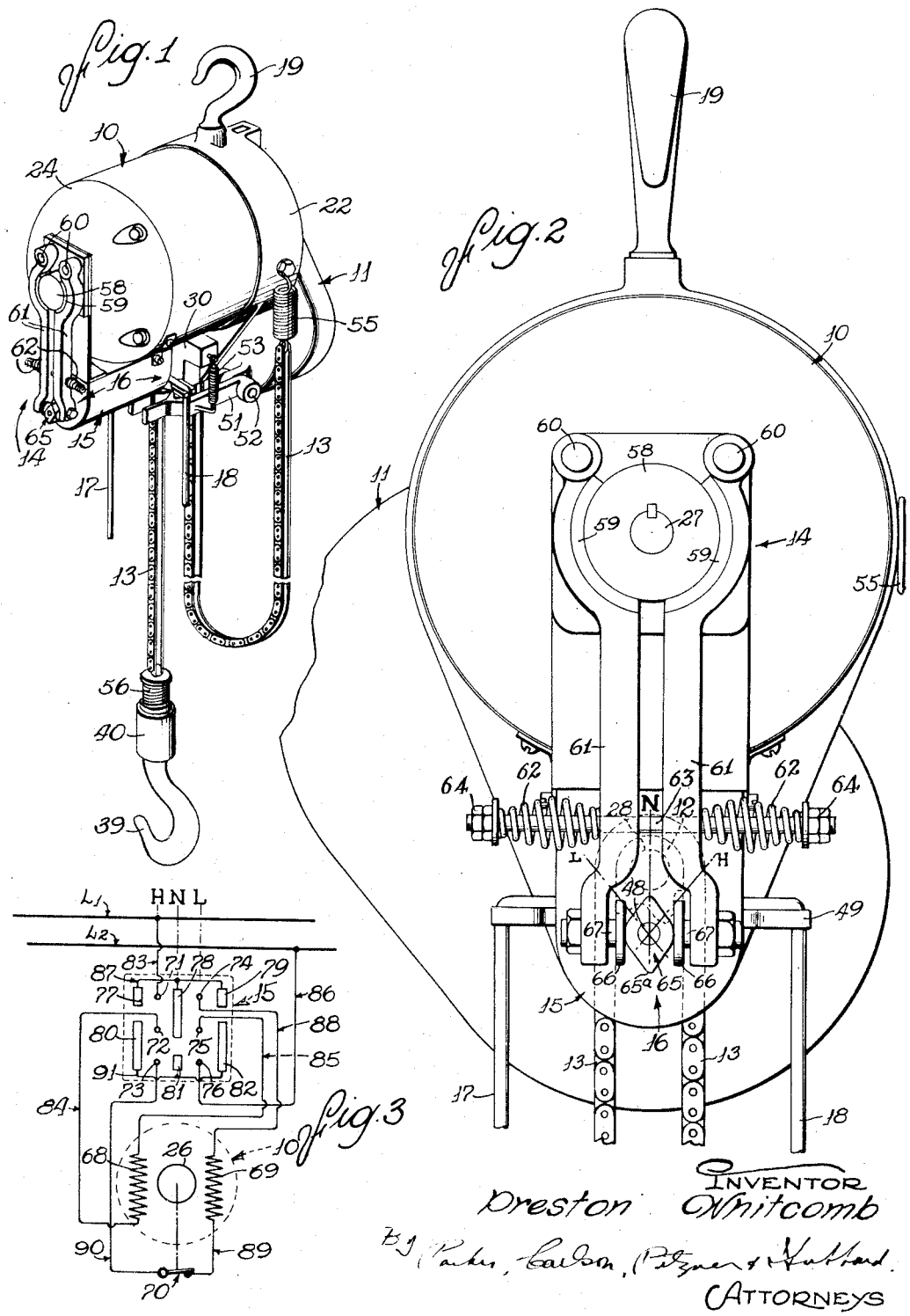

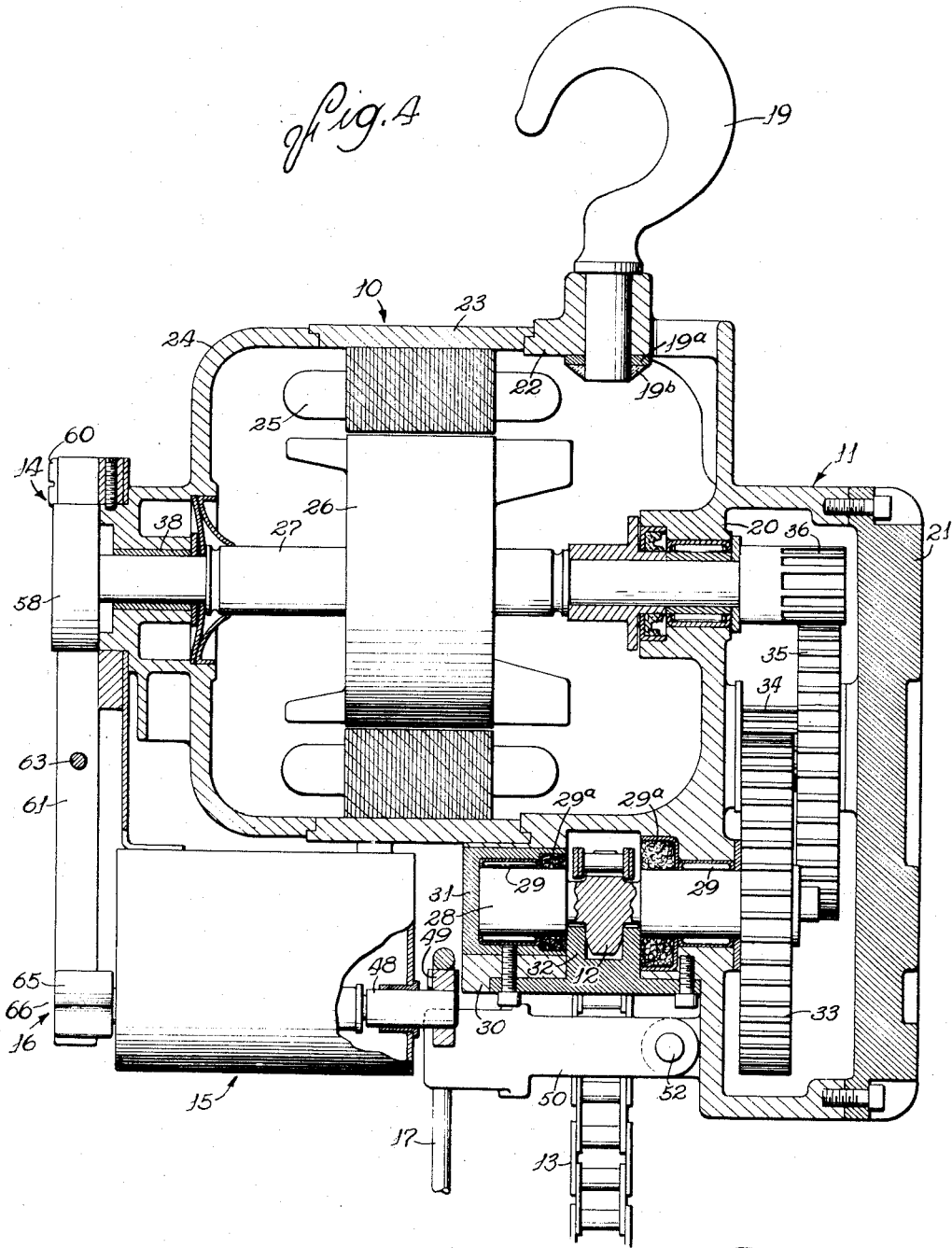

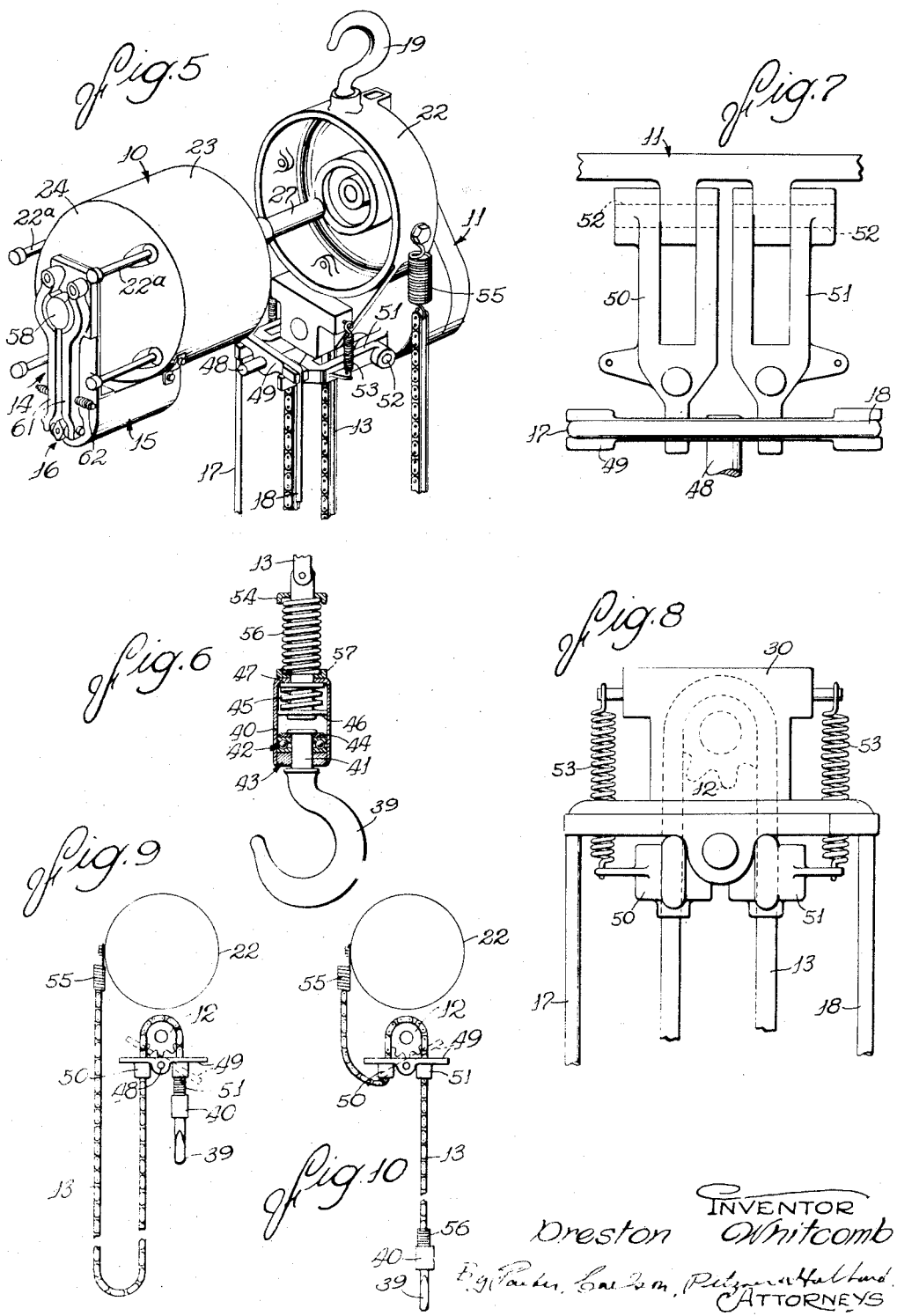

Patented Feb. 24, 1942

2,274,175

UNITED STATES PATENT OFFICE 2,274,175

ELECTRIC HOIST

Preston Whitcomb, Buffalo, N. Y., assignor to Manning, Maxwell & Moore, Inc., Muskegon, Mich., a corporation of New Jersey Application September 6, 1938, Serial No. 228,509

8 Claims. (Cl. 172—179)

The invention relates to electric hoists and some features of the invention find particular although not exclusive utility in small compact hoists of the portable type as distinguished from larger carriage mounted hoists.

One object of the present invention is to provide a hoist embodying a small and cheap form of alternating current motor together with an associated control capable of positively insuring reversal of the motor when changing from hoisting to lowering or vice versa. In this connection it should be noted that the use of single phase alternating current motors with a main winding and a light auxiliary starting winding controlled by a speed responsive switch has not heretofore been possible in a hoist because of the peculiarity of such motors that they cannot be reversed when in operation by merely reversing the voltage on the main windings in contrast with other but more expensive types of motors which can be so controlled. The construction herein disclosed is especially arranged to obviate this difficulty and makes possible the use of a small and cheap alternating current motor of the type noted.

A more specific object of the invention is to provide in a hoist embodying an alternating current motor of the type described and including a speed responsive switch for controlling its starting winding, a brake for arresting rotation of the motor together with a reversing controller adapted to set the brake automatically for a sufficient period of time to slow down the motor to a point at which the speed responsive switch will be actuated to render the starting winding operative, and thereby make possible the reversal of the motor when the controller is shifted from hoisting to lowering position or vice versa.

Another object of the invention is to provide an electric hoist embodying an alternating current motor of the type described together with a speed responsive switch for the motor starting winding, a brake for arresting rotation of the motor, and means for setting the brake when the motor is stopped and for automatically preventing release of the brake until substantially the instant at which the motor is energized, thereby preventing a gravital descent of a load on the hoist in a period between release of the brake and energization of the motor. In this connection it should be noted that when using an alternating current motor of the type described, if the load is allowed to descend by gravity during an interval between the release of the brake and energization of the motor, the motor will attain such speed that the starting winding speed responsive switch opens and consequently subsequent energization of the main winding, irrespective of the voltage polarity, simply causes the motor to continue rotation in the direction in which it has started. As a result hoisting is impossible under such conditions. This is another fault of such motors when used under the operating conditions peculiar to hoists which the present hoist construction is arranged to overcome.

Further objects and advantages of the invention will become apparent as the following description proceeds, taken in connection with the accompanying drawings, in which:

Figure 1 is a general perspective view of a hoist embodying the invention;

Fig. 2 is an enlarged end elevation of the brake end of the hoist of Fig. 1;

Fig. 3 is a wiring diagram of the motor control circuits of the hoist;

Fig. 4 is an enlarged longitudinal vertical sectional view of the hoist;

Fig. 5 is an exploded perspective view of the hoist;

Fig. 6 is an enlarged detail view, partly in section, of the load supporting hook;

Figs. 7 and 8 are respectively plan and end elevational detail views of the limit control mechanism for the hoisting chain;

Figs. 9 and 10 are generally diagrammatic views of the hoist illustrating the positions of the limit control mechanism parts at the respective upper and lower limits of the hoisting hook travel.

The invention has been shown herein, for the purpose of illustration and explanation of its various novel features, as embodied in a portable hoist (Fig. 1). This hoist is extremely compact in construction. Moreover the cost of manufacture has been markedly reduced as compared to many prior forms of electrical hoists, although without sacrifice in operating efficiency and effectiveness, or in ruggedness of construction. To identify the principal parts of the hoist in a few words, it embodies in general an electric driving motor 10, a gear casing 11 secured to one end of the motor, and a rotatable hoisting member or chain pinion 12 (Fig. 2) having a hoist line in the form of a roller chain 13 reeved thereover and connected to the motor 10 through a suitable speed reduction gearing in the gear case 11. The hoist also includes a brake mechanism 14 and a reversible motor controller 15, the brake and controller being actuated through a combined operating mechanism 16 which is operated through the medium of a pair of manual control cords 17 and 18. The entire hoist structure may be suspended at any place of use desired by some suitable means such as a hook 19.

Referring more particularly to the details of the illustrated construction shown it will be seen (Figs. 1, 4 and 5) that the gear case 11 is of generally flat configuration and is disposed in a vertical plane. It includes a cup-shaped shell or casting 20 (Fig. 4) with a generally flat bottom wall defining one end face of the gear casing. Bolted to the open end of the shell 20 is a removable end plate 21 defining the opposite or outer end face of the casing 11. This end plate 21 is preferably made quite thick or heavy in order that it may serve as a counter-weight for the brake mechanism 14 and a portion of the overhanging motor structure.

An integral cylindrical extension 22 is preferably fashioned on the inner side of the casting 20 to receive the motor 10 (Fig. 5) to which it is secured by through bolts 22ª. This motor is of conventional shape and embodies a cylindrical frame or casing 23 (Fig. 4) having its outer end closed by an end bell 24. A similar end bell, which usually closes the opposite end of the motor, is dispensed with and the gear casing used to close such end of the motor. Within the motor frame 23 is mounted a stator 25 cooperating with a suitable rotor 26 carried on a motor drive shaft 27. The motor 10 and gear case 11 are fixedly secured together as a unitary structure and the motor casing and gear case constitute the only frame or body structure which is required. The supporting hook 19 is fixed to the cylindrical casting extension 22 as by welding a washer 19ª on the hook shank at 19ᵇ (Fig. 4).

For the sake of compactness and simplicity of construction the chain pinion 12 is preferably disposed below the motor 10. In the present instance (Fig. 4) the pinion 12 is formed integrally with a supporting stub shaft 28 journalled in a suitable pin type bearing 29 within an integral extension 30 on the lower portion of the inner face of the gear case 11. Lubricant is supplied to the bearings from oil impregnated packings 29ª, and the outer bearing is located in an insert 31 in the end of the extension 30. The lower side of the pinion 12 is embraced by an arcuate chain guide 32 of U-shaped cross section. It will be noted that the pinion 12 is located directly below, i. e. in vertical alinement with, the supporting hook 19. Furthermore the mass of the hoist is symmetrically distributed about this vertical center line. By securing the hook to the casing 11 load forces are transmitted directly to it through only the casting 20. Furthermore the symmetrical distribution of weight prevents tilting or skewing of the hoist. A roller type chain is preferred as a hoist line since it is non-stretching as well as non-fatiguing and permits the use of a very simple and strong five tooth sprocket.

A driving connection is formed between the pinion 12 and the motor 10 by suitable speed reduction gearing housed within the gear case 11 (Fig. 4). This speed reduction gearing includes a gear 33 fast on the pinion shaft 28 and meshing with an intermediate pinion 34 journaled between the opposed walls of the gear case shell 20 and end plate 21. A second gear 35 fast with the intermediate pinion 34 meshes with a drive pinion 36 fast on the end of the motor shaft 27. It will be noted that the inner end of the motor shaft 27 is journaled in a suitable roller pin type bearing 37 supported on the gear case 11, rather than on the motor casing, so as to minimize the over-all length of the hoist. The outer end of the motor shaft is journaled in a bearing 38 in the motor end bell 24.

The hoisting line is preferably made in the form of a roller-type chain such as the chain 13 illustrated. This chain is reeved over the pinion 12 and a suitable load-supporting member such as a hook 39 is secured to a depending end of the hoisting chain (Fig. 1). In the event that a single speed electric driving motor is utilized it is desirable that some means be provided for easing the initial shock of load application on the chain during hoisting. This is particularly necessary in the event that a roller-type chain is used since there is little or no slack in such a chain. For this purpose a sleeve 40 is telescoped about the shank 41 of the hook (Fig. 6). A swivel connection is formed between the sleeve and the hook by a ball bearing 42 interposed between a bottom end wall 43 on the sleeve and a washer 44 surrounding the hook shank 41 and held against disengagement from it by the peened end of the shank. The upper end of the sleeve 40 is yieldably secured to the lower end of the chain 13 by means of a heavy compression spring 45. This spring is housed within the sleeve 40 and is interposed between a washer 46 secured to the lower end of the chain and a flange 47 which forms an upper end wall for the sleeve.

The reversible motor controller 15 is housed within a casing (Fig. 4) secured to the lower side of the motor 10 and embodies a series of fixed contacts cooperating with suitable movable contacts actuated by rock shaft 48. This controller shaft 48 is movable from a central or neutral position indicated by the dot-dash line N in Fig. 2, and in which the motor is deenergized, alternatively to either a hoisting or lowering position, indicated by the respective dot-dash lines marked H and L. When the controller is shifted to its hoisting position the member 10 is connected for rotation to lift the hook 39 and similarly when the controller is shifted to its lowering position the motor is energized to lower the load hook, the particular connections for this purpose being hereinafter described in further detail. The controller rock shaft 48 is shifted by means of the control cords 17 and 18 depending from the outer ends of a cross bar 49 fast on the shaft 48. The operator pulls down on the cord 17 for lowering and on the cord 18 for hoisting.

As a precaution against overrunning at either extremity of the hoisting or lowering movement of the chain 13, an improved form of limit control mechanism has been provided for cooperation with the controller 15. This mechanism embodies two yoke-shaped control levers 50 and 51 (Figs. 7 and 8) pivoted on the gear case 11 at 52 (see also Fig. 4) and arranged to underlie the cross arm 49 on the rock shaft 48. These levers are yieldably urged upwardly against the cross arm 49 by helical tension springs 53 anchored at their lower ends to the levers and at their upper ends to the chain pinion housing 30. By the use of these springs the controller rock shaft 48 is yieldably urged to its neutral position so that whenever the operator releases the cords 17 or 18 the controller returns to neutral and stops the motor. No additional springs need be provided in the controller itself for this purpose. The lever 50 is adapted to stop the motor when the chain 13 has reached its extreme lowered position. For this purpose the chain 13 is looped about the lever 50 with one end secured to the hoist body structure. Consequently this loop draws up as the load hook 39 descends and finally pulls the lever 50 upward from the dotted line position of Fig. 10, in which the motor is energized for lowering, to its neutral position indicated in full lines, and in which the motor is stopped. Similarly during hoisting the lever 51 is depressed by the controller cross arm 49 and is pushed back to neutral position at the upper extremity of hoisting movement when the lever 51 is struck by an abutment 54 on the hoisting chain. In each case the controller 15 is automatically returned to neutral position to stop the motor. The levers 50 and 51 are preferably of yoke shape as shown so that the chain can be led through them. In this way the levers form fair-leading guides for the chain to the sprocket regardless of any lateral swinging of the load.

In order to prevent breakage of the control levers 50—51, and especially when using a stiff roller chain such as that illustrated, means is provided for cushioning the shock of the blows struck them by the chain 13 or abutment 54. To this end the chain 13 is yieldably connected to the gear case 11 by a helical tension spring 55 (Fig. 5). Similarly the abutment 54, in the form of a collar surrounding the lower end of the chain, is cushioned on a helical compression spring 56. This latter spring abuts against the upper end of the sleeve 40 and is held against lateral displacement by a cup-shaped retainer 57.

In order to hold the hoisting chain 13 in any selected stopped position, the brake mechanism 14 is arranged to hold the motor shaft 27 positively against rotation whenever the controller 15 is in its neutral position. The brake mechanism illustrated (Fig. 2) comprises a brake drum 58 keyed to the outboard end of the motor shaft 27 and a cooperating pair of brake shoes 59 embracing the drum 58 and pivoted on the motor end bell at 60. An elongated lever arm 61 is provided on each of the brake shoes, these two arms being disposed in spaced relation. A pair of compression springs 62 surrounding a pin 63 and held against the opposite outer sides of the arms 61 by nuts 64 serve to urge arms toward each other so that the brake shoes 59 are yieldably pressed into engagement with the brake drum 58.

A single combined actuator mechanism 16 is utilized for operating not only the controller 15 but also the brake mechanism 14. This apparatus includes the cross arm 49 fast on the rock shaft 48 previously described, and having the control cords 17—18 depending from its outer ends. The control mechanism also includes a cam 65 fast on the outboard end of the rock shaft 48 and adapted to cooperate with the brake shoe arms 61 to release the brake whenever the controller 15 is moved to either its hoisting or lowering positions. The cam 65 is of a general diamond shape, with its major axis disposed vertically when the rock shaft 48 is in its neutral position. A pair of abutment heads 66 are adjustably mounted on the lower ends of the brake arms 61 by threaded pins 67 and are disposed on opposite sides of the cam 65. Accordingly when the cam 65 is oscillated either clockwise or counterclockwise the high points 65ª on it contact the abutments 66 and spread the brake arms 61 apart so that the brake shoes 59 are shifted out of engagement with the brake drum 58. It will be noted that the cam 65 is so contoured that the brake is not released until the cam has been shifted a substantial distance from its neutral position and fully into the positions indicated by the dot-dash lines marked L and H in Fig. 2. By virtue of this arrangement, the brake is not released until substantially the instant at which the corresponding controller contacts are closed. Furthermore there is a relatively long period of dwell during which the brake is applied during the shifting of the controller from its hoisting to its lowering positions and vice versa. The purposes of such actions of the cam in relation to the particular type of motor used are pointed out below in greater detail.

The low cost of the hoist described is in a large measure attributable to the particular type of motor utilized. The motor illustrated is a single phase alternating current motor of the split-phase type. Upon reference to the wiring diagram in Fig. 3, it will be seen that it includes a main field winding 68 on the stator and an auxiliary starting winding 69. If desired a suitable capacitor may be connected in series with the starting winding for further modifying the phase of the current therein with respect to that in the main winding. For the sake of cheapness of construction, the starting winding 69 is made of relatively low current carrying capacity and must therefore be cut out of circuit as soon as the motor comes up to speed. If it is not so cut out such a light winding will be burned out under sustained load. For this purpose the conventional speed responsive switch 70, which may be of the centrifugal type, is incorporated in the motor. This switch serves to open-circuit the starting winding after the motor attains a predetermined speed. It should also be noted that this switch 70 again closes to cut the starting winding back into circuit when the motor is decelerating although its reclosure usually occurs at a somewhat lower speed than that at which it opens because of the inherent sluggishness of such centrifugal switches. Current is supplied to the motor from suitable alternating current supply lines $L_1$—$L_2$. The controller 15 has been shown in developed or diagrammatic form in Fig. 3. It embodies two rows of fixed contacts 71—73 and 74—76 as well as a cooperating set of movable contacts 77—82 shiftable by the rock shaft 48 from the neutral position illustrated in which their center line is at N to either a hoisting or lowering position with the movable contact center line respectively at H and L. When shifted to the hoisting position the motor main winding 68 is energized (through a circuit $L_1$—83—71—78—72—84—68—85—75—82—76—86—$L_2$) and the starting winding 69 is also initially energized (through a circuit $L_1$—83—71—78—87—79—88—69—89—70—90—73—81—91—82—76—86—$L_2$). It will be noted that the starting winding circuit includes the speed responsive switch 70 and accordingly as soon as the motor reaches a predetermined speed the opening of this switch open-circuits the starting winding. In the same way when the controller 15 is shifted to lowering position the main winding 68 is energized but with reversed voltage (through a circuit $L_1$—83—71—77—81—78—75—85—68—84—72—80—91—82—72—86—$L_2$) while the starting winding is again initially energized with the speed responsive switch 70 in series (through a circuit L₁—83—71—77—87—78—74—88—69—89—70—90—73—80—91—81—76—86—L₂).

It is an inherent characteristic of such single phase alternating current starting winding motors as that described that they cannot be reversed by simple reversal of the instantaneous polarity of the voltage applied to the main winding unless the starting winding is also in circuit. More particularly if the motor is operating at normal speed in one direction, and consequently with the starting winding open circuited, a reversal of the instantaneous polarity of the voltage applied to the main winding will have no effect on the direction of rotation of the motor but it will simply continue to run in the direction in which it has previously been rotating. In common electrical engineering parlance, such a motor cannot be "plugged." This peculiar characteristic has heretofore generally limited the use of such motors to installations in which they are required to operate in but one direction as, for example, in driving washing machines. Motors of this type are however made in very large quantities by low cost mass production methods which makes their use desirable from a standpoint of cost. Furthermore it is desirable to use a single phase motor rather than a polyphase motor, despite the fact that the latter can be readily reversed by a mere reversal of voltage on the main windings, since most small shops, garages and the like are only equipped with single phase sources of alternating current such as are used in ordinary lighting systems.

The difficulty of reversal noted has been overcome in the present instance by incorporating in the hoist, means for positively insuring energization of the starting winding in response to a shifting of the controller 15 from its hoisting to its lowering position and vice versa. In particular, the cam 65 automatically sets the brake 14 for a substantial period of time while the controller is being shifted from either its hoisting or lowering position to the other. In other words, due to the pointed shape of the active noses 65ᵃ on the cam they do not effectively contact the abutments 66 on the brake arms until swung fully to the positions indicated at H and L in Fig. 2. As a result there is a fairly long period of dwell between hoisting and lowering during which the brake is applied. It is for this reason that the particular shape of cam 65 described is preferably used since application of the brake 14, during the transition period between hoisting and lowering or vice versa, slows down the motor 10 to a speed at which the centrifugal switch 70 falls closed, thereby energizing the motor starting winding 69. With the starting winding in circuit the motor can be reversed at will by reversing the instantaneous polarity of the voltage applied to the main winding 68. When the starting winding is in circuit reversal takes place upon reversal of voltage; when the starting winding is not in circuit reversal does not take place. As a result of automatically cutting in the starting winding, the motor 10 is with the arrangement described, effectually reversed for either hoisting or lowering despite the fact that the motor is one that cannot be "plugged."

As was previously noted the cam 65 is preferably contoured so that the brake 14 will be released at substantially the same instant that the contacts of the controller 15 are closed for either hoisting or lowering. Such action is to be contrasted with that in which the brake is for example released somewhat before the closure of these contacts. With the latter type of arrangement there may be a substantial interval between the release of the brake and the application of current to the motor. In such case if a load is suspended from the hoisting chain 13, the load will begin to descend by gravity during the interval noted. As a result the motor rotor 26 is accelerated with extreme rapidity and the centrifugal switch 70 opened before any current is supplied to the motor. Accordingly, with the starting winding 69 thus open circuited, when voltage is subsequently applied to the main winding 68 by closing even the hoisting contacts of the controller 15, the resultant energization of the motor will simply cause it to continue to rotate in the same direction for descent of the load. Furthermore the acceleration of the motor is likely to be so great that the centrifugal switch 70 will be thrown apart and even the motor rotor strained or broken by centrifugal force. This dangerous condition is obviated by the control arrangement described. Since the cam 65 releases the brake 14 at substantially the same instant that the motor circuit is completed there is no opportunity for free gravital descent of the load. Accordingly the arrangement is such as to accommodate even a motor with the limited characteristics described for use under the severe operating conditions peculiar to an electric hoist.

The operation of the hoist will in general be understood from the foregoing. As a brief résumé let it be assumed that the operator wishes to lift a load. In such case the load is attached to the hook 39 and the operator pulls down on the cord 18 thereby tilting the controller rock shaft 48 and consequently energizing the motor 10 for hoisting as previously described. To stop the hoisting operation, the operator simply releases the cord 18 so that the centering springs 53 pull the rock shaft 48 back to neutral position and open circuit the motor. At the same time the cam 65 releases the brake arms 61 so that the brake 14 is applied to hold the load suspended. Similarly to lower the load hook 39, the operator pulls down on the control cord 17 thereby shifting the controller rock shaft to connect the motor 10 for lowering and to release the brake 14. Again the hoist is stopped at will by simply releasing the control cord so that the controller rock shaft may return to its neutral position. By virtue of the improved arrangement herein disclosed the controller may be shifted from hoisting to lowering position or vice versa but with a reversal of the motor insured as previously described.

Although a particular embodiment of the invention has been shown and described in some detail for purposes of illustration and explanation of its various novel features, there is no intention to limit the invention thereby to irrelevant details of such embodiment but on the other hand the appended claims are intended to cover all modifications and alternative constructions falling within the spirit and scope of the invention.

I claim as my invention:

1. An electric hoist comprising, in combination, a single phase alternating current motor embodying a main winding and an auxiliary starting winding, a rotatable hoisting member operatively connected in driven relation to said motor, a releasable brake for holding said hoisting member against rotation, means including a reversing controller for said motor movable from a neutral position alternatively to hoisting or lowering positions for respectively open circuiting said motor and energizing the same with a voltage of correspondingly reversed instantaneous polarity, said controller being movable from hoisting to lowering position and vice versa with a period of dwell in said neutral position during which said motor is deenergized, a speed responsive switch for rendering said starting winding inoperative when said motor is rotating at a speed in excess of a predetermined value, and means operable in response to the movement of said controller from hoisting to lowering position or vice versa for fully applying said brake during substantially all of said period of dwell to reduce the speed of said motor to a point below said predetermined value, whereby said switch is closed during said period of dwell for energization of said starting winding to make possible reversal of said motor.

2. An electric hoist comprising, in combination, a single phase alternating current motor embodying a main winding and an auxiliary starting winding, a rotatable hoisting member operatively connected in driven relation to said motor, a releasable brake for holding said hoisting member against rotation, means including a reversing controller for said motor movable from a neutral position alternatively to hoisting or lowering positions for respectively open circuiting said motor and energizing the same with a voltage of corresponding reversed instantaneous polarity, said controller being movable from hoisting to lowering position and vice versa with a period of dwell in said neutral position during which said motor is deenergized, a speed responsive switch for rendering said starting winding inoperative when said motor is rotating at a speed in excess of a predetermined value, and means including a generally diamond-shaped cam oscillatable in response to the movement of said controller from hoisting to lowering position or vice versa and a cam follower brake actuator engageable by said cam for fully applying said brake during substantially all of said period of dwell to reduce the speed of said motor to a point below said predetermined value, whereby said switch is closed for energization of said starting winding to make possible reversal of said motor.

3. An electric hoist comprising, in combination, a single phase alternating current motor embodying a main winding and an auxiliary starting winding, a rotatable hoisting member operatively connected in driven relation to said motor, a speed responsive switch for rendering said starting winding inoperative when said motor is rotating at a speed in excess of a predetermined value, means including a reversing controller for said motor movable from a neutral position alternatively to hoisting or lowering positions for respectively open circuiting said motor and energizing said main winding with a voltage of correspondingly reversed polarity, and means operative in response to movement of said controller from hoisting to lowering position or vice versa for slowing down the motor to a point at which said speed responsive switch is actuated to energize said auxiliary starting winding to thereby make possible reversal of said motor.

4. An electric hoist embodying a reversible single phase alternating current electric motor comprising a main winding and an auxiliary starting winding, a speed responsive switch for rendering said starting winding inoperative when said motor is rotating at a speed in excess of a predetermined value, and a reversing controller for said motor movable from a neutral position alternatively to hoisting and lowering positions, said hoist being characterized by means responsive to a shifting of said controller from hoisting to lowering position or vice versa for insuring energization of said auxiliary starting winding to make possible reversal of said motor in response to such shifting of said controller.

5. An electric hoist comprising, in combination, a single phase alternating current motor embodying a main winding and an auxiliary starting winding, a rotatable hoisting member adapted to support a load and operatively connected in driven relation to said motor, means including a reversing controller for said motor movable from a neutral position alternatively to hoisting or lowering positions for respectively open circuiting said motor and energizing the same with a voltage of correspondingly reversed instantaneous polarity, a speed responsive switch for rendering said starting winding inoperative when said motor is rotating at a speed in excess of a predetermined value, a releasable brake for holding said hoisting member against rotation, and means operable automatically upon energization of said motor by movement of said controller from neutral position to either hoisting or lowering position for releasing said brake substantially coincidentally with the energization of the motor by the controller to prevent acceleration of the motor by a load on said hoisting member with consequent inadvertent actuation of said speed responsive switch.

6. An electric hoist comprising, in combination, a single phase alternating current motor embodying a main winding and an auxiliary starting winding, a rotatable hoisting member operatively connected in driven relation to said motor, a speed responsive switch for rendering said starting winding inoperative when said motor is rotating at a speed in excess of a predetermined value, means including a reversing controller for said motor movable from a neutral position alternatively to hoisting or lowering positions for respectively open-circuiting said motor and energizing said main winding with a voltage of correspondingly reversed polarity, said motor being retained open-circuited by said controller during the movement of the latter between its hoisting and lowering positions and vice versa, a brake for said motor, and means including a cam having diametrically opposite lobes oscillatable in response to the movement of said controller from hoisting to lowering position or vice versa and a cam follower displaced by said lobes only when the cam is substantially in its full hoisting or lowering position for releasing said brake only when said controller is in its hoisting or lowering positions and for retaining said brake applied during substantially all of the period in which said controller is moving from hoisting to lowering position or vice versa with the motor open-circuited.

7. An electric hoist embodying a reversible single phase alternating current electric motor comprising a main winding and an auxiliary starting winding, a revoluble hoisting member driven by said motor, a speed responsive switch for rendering said starting winding inoperative when said motor is rotating at a speed in excess of a predetermined value, and a reversing controller for said motor movable from a neutral position alternatively to hoisting and lowering positions, said hoist being characterized by means operable automatically upon shifting of said controller from hoisting to lowering position or vice versa for insuring energization of said auxiliary starting winding to effect reversal of said motor in response to such shifting of said controller, and said means including a brake operable automatically upon shifting of said controller from either hoisting or lowering position to neutral to positively arrest rotation of said hoisting member and hold the same against further rotation so as to prevent inadvertent gravity descent of a load on the hoisting member while said controller is in neutral.

8. An electric hoist comprising, in combination, a single phase alternating current motor embodying a main winding and an auxiliary starting winding, a rotatable hoisting member operatively connected in driven relation to said motor, means including a reversing controller for said motor movable from a neutral position alternatively to hoisting or lowering position for respectively open circuiting said motor and energizing the same with a voltage of correspondingly reversed instantaneous polarity, a releasable brake for holding said hoisting member against rotation, and means operable automatically upon energization of said motor by said controller by movement of said controller from neutral to hoisting or lowering position for releasing said brake substantially coincidentally with the energization of the motor by the controller to prevent overpowering the motor starting torque by opposing it with the braking force in addition to the load on the hoist.

PRESTON WHITCOMB.